(12) United States Patent
Ito

(10) Patent No.: US 9,960,613 B2
(45) Date of Patent: May 1, 2018

(54) BATTERY-OPERATED ELECTRONIC EQUIPMENT

(71) Applicant: CASIO COMPUTER CO., LTD., Shibuya-ku, Tokyo (JP)

(72) Inventor: Takashi Ito, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 116 days.

(21) Appl. No.: 15/074,335

(22) Filed: Mar. 18, 2016

(65) Prior Publication Data
US 2016/0380452 A1    Dec. 29, 2016

(30) Foreign Application Priority Data

Jun. 24, 2015    (JP) .................................. 2015-126106

(51) Int. Cl.
*H02J 7/00*    (2006.01)
(52) U.S. Cl.
CPC ...... *H02J 7/0031* (2013.01); *H02J 2007/0096* (2013.01)
(58) Field of Classification Search
CPC ........ H02J 7/004; H02J 7/0031; H02J 7/0036; H02J 7/0096; H02J 2007/0095; H02J 2007/0096

USPC .................................................. 320/149, 159
See application file for complete search history.

(56) References Cited

U.S. PATENT DOCUMENTS

2015/0333569 A1*   11/2015   Takemura ............... H04B 3/54
                                                     307/66

FOREIGN PATENT DOCUMENTS

JP                09114560 A      5/1997

* cited by examiner

*Primary Examiner* — Paul Dinh
(74) *Attorney, Agent, or Firm* — Holtz, Holtz & Volek PC

(57) ABSTRACT

An electronic equipment, including: an electronic circuit which includes a control section and performs a predetermined functional operation; a battery which supplies electric power to the electronic circuit; a supply detecting section which detects power supply from outside; and a supply cutoff section which cuts off power supply from the battery to the electronic circuit, wherein when the supply detecting section detects the power supply from outside, the supply detecting section performs a battery connection operation of releasing cutoff of the power supply by the supply cutoff section.

18 Claims, 3 Drawing Sheets

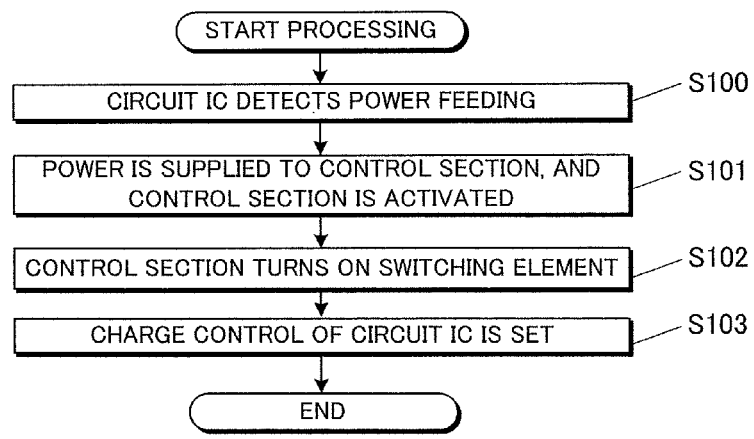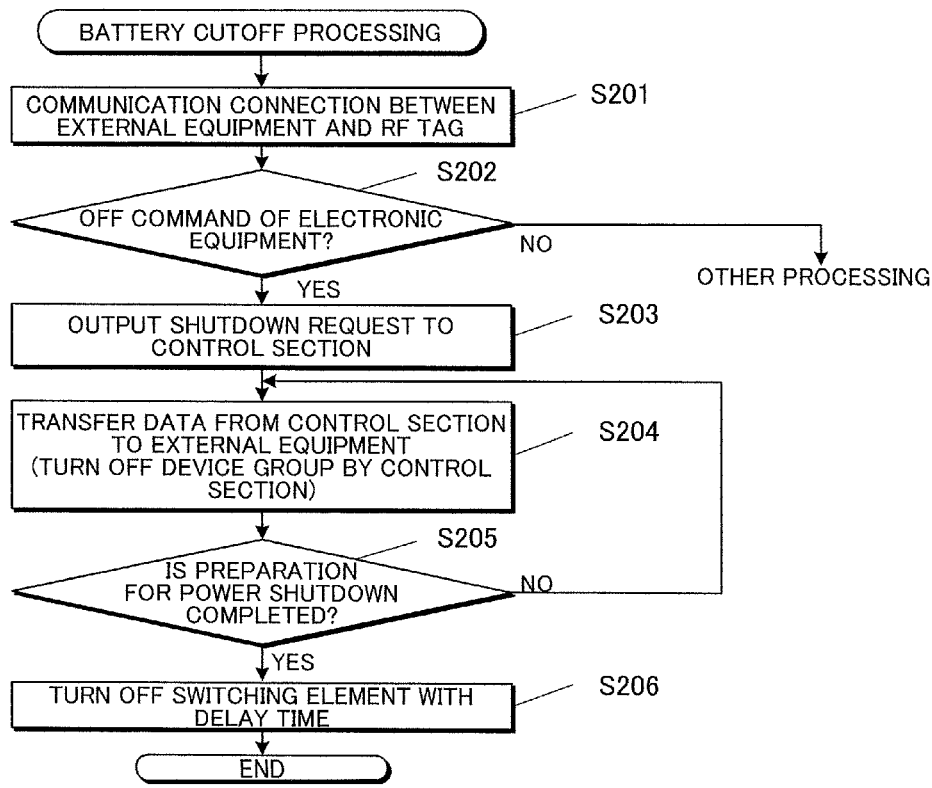

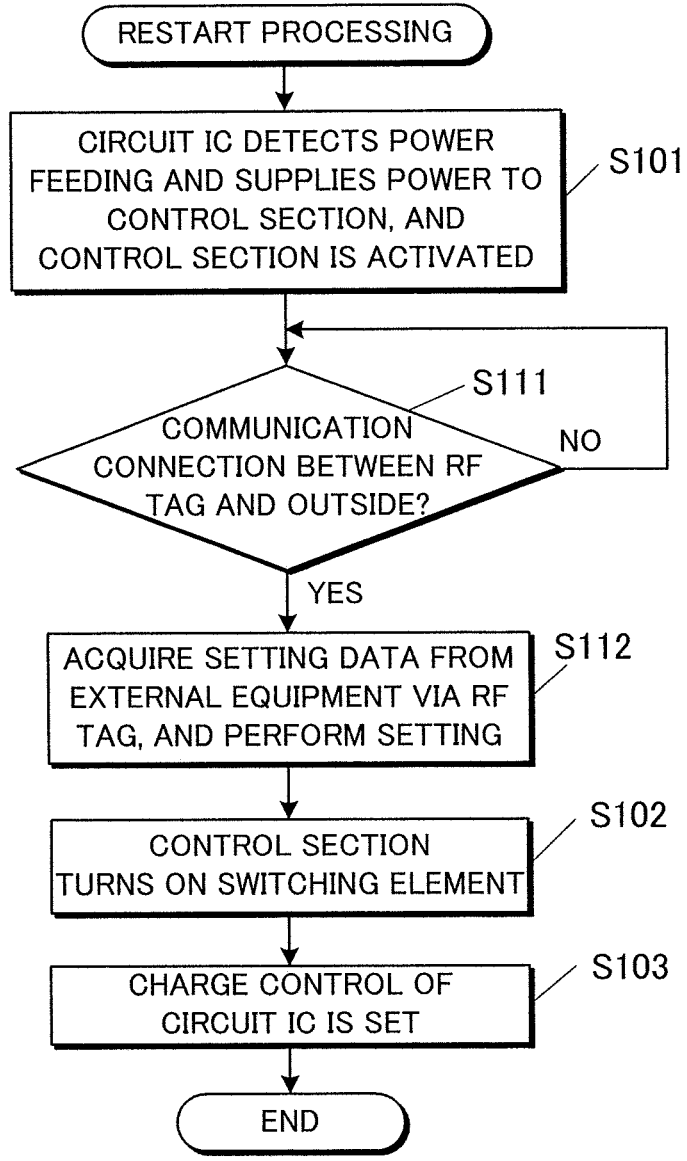

BATTERY-OPERATED ELECTRONIC EQUIPMENT

CROSS-REFERENCE TO RELATED APPLICATIONS

The entire disclosure of Japanese Patent Application No, 2015-126106 filed on Jun. 24, 2015 including description, claims, drawings, and abstract are incorporated herein by reference in its entirety.

BACKGROUND OF THE INVENTION

1. Field of the Invention

The present invention relates to a battery-operated electronic equipment.

2. Description of Related Art

Conventionally, there have been electronic equipments which are operated by rechargeable batteries, dry cell batteries and such like as power sources.

In such electronic equipments, even while the normal operation of electronic equipment is not performed, minute electric power is continuously consumed in many cases by electronic circuits such as microcomputers (IC chips), logic circuits and sensor circuits which are included in the electronic equipments, and thus, the batteries discharge.

In a state in which a battery is attached to an electronic equipment, when the electronic equipment is not sold or is left unused after the user acquires the electronic equipment, the discharge of battery proceeds over time, leading to difficulty in using the dry cell battery or unintended cutoff of power supply from the rechargeable battery, further leading to deep discharge which makes it impossible to recharge the battery, and thus, causing problems in selling or using the electronic equipment in some cases.

With respect to this, Japanese Patent Application Laid-Open Publication No. H9-114560 discloses a technique which includes a circuit configuration to output awake up signal at predetermined intervals, and lengthens the life of battery by periodically stopping the microcomputer operation in a standby state and also stopping the standby current until the wake up signal is output.

SUMMARY OF THE INVENTION

According to one aspect of the present invention, there is provided an electronic equipment, including: an electronic circuit which includes a control section and performs a predetermined functional operation; a battery which supplies electric power to the electronic circuit; a supply detecting section which detects power supply from outside; and a supply cutoff section which cuts off power supply from the battery to the electronic circuit, wherein when the supply detecting section detects the power supply from outside, the supply detecting section performs a battery connection operation of releasing cutoff of the power supply by the supply cutoff section.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 2 is a flowchart showing an operation procedure of start processing of the electronic equipment;

FIG. 3 is a flowchart showing a procedure of battery cutoff processing by an RF tag; and FIG. 4 is a flowchart showing an operation procedure of restart processing.

DETAILED DESCRIPTION OF THE PREFERRED EMBODIMENT

Figure 1:
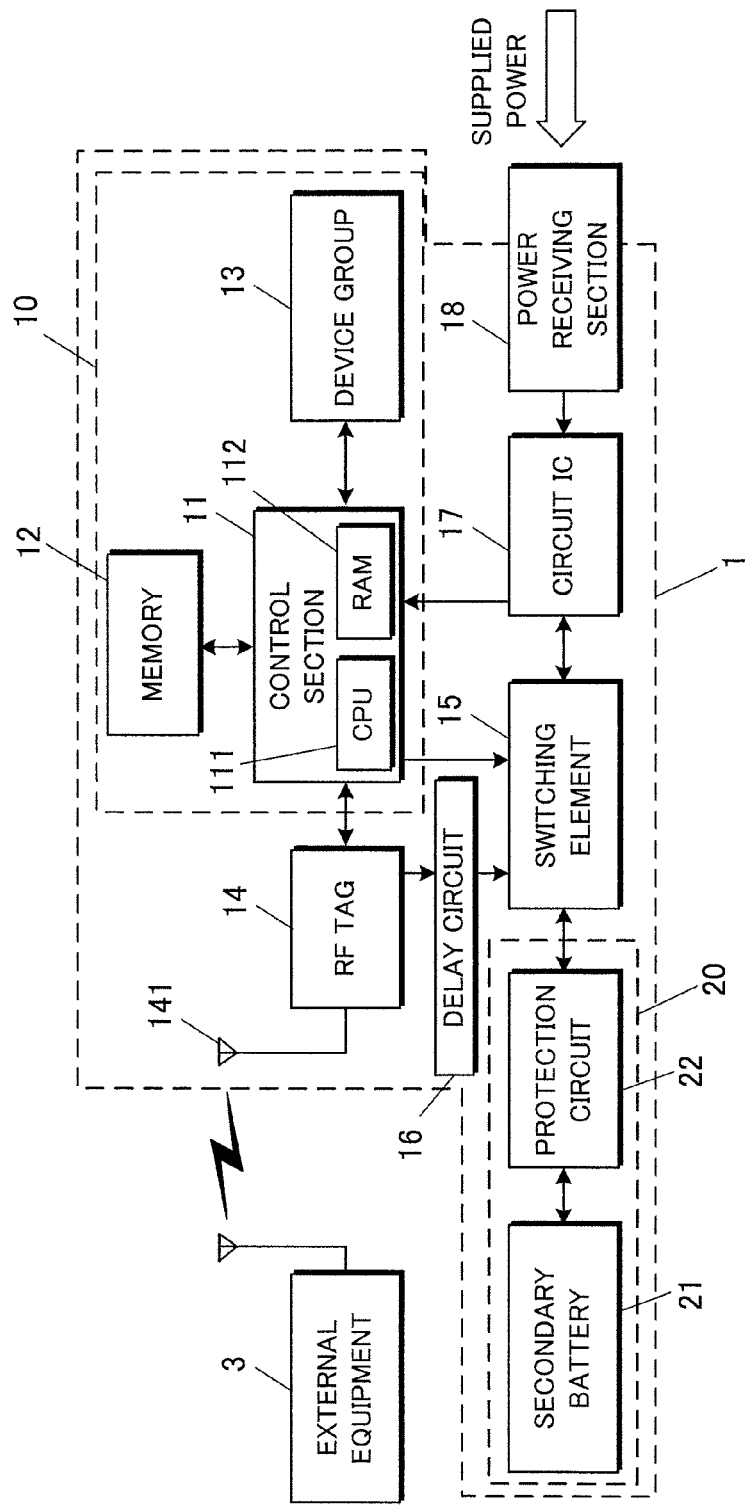
FIG. 1 is a block diagram showing a functional configuration of an electronic equipment in an embodiment of the present invention.

Hereinafter, an embodiment of the present invention will be described on the basis of the drawings.

FIG. 1 is a block diagram showing a functional configuration of an electronic equipment 1 in the embodiment.

The electronic equipment 1 includes a control section 11, a memory 12, a device group 13, an RF tag 14, an antenna 141, a secondary battery 21 (battery), a protection circuit 22, a switching element 15 as a supply cutoff section, a delay circuit 16, a circuit IC 17 as a supply detecting section, a power receiving section 18 and such like.

The control section 11 is a microcomputer which performs arithmetic control according to the entire operation of the electronic equipment 1. The control section 11 has a CPU 111 (Central Processing Unit), a RAN 112 (Random Access Memory) and such like, and is integrally formed on a substrate, though not especially limited. The CPU 111 performs various types of arithmetic processing and controls the electronic equipment 1 to perform predetermined functional operations. The RAM 112 provides working memory space to the CPU 111 and stores temporal data. Programs executed by the CPU 111 at the time of standby, setting data and such like are also stored in the RAM 112.

The control section 11 in the embodiment can be in an operating state, a standby state in which normal functional operations are stopped and only a specific maintaining operation is performed, and a stopped state in which operations are completely stopped.

The memory 12 is a non-volatile external memory such as a flash memory and an EEPROM (Electrically Erasable and Programmable Read Only Memory), and stores programs, setting data and such like to be read out as needed in the electronic equipment 1. From among the temporal data stored in the RAM 112, data which needs to be maintained when the power is turned off can be backed up in this memory 12.

The device group 13 includes various peripheral devices such as a display output section, an input operation receiving section and a measurement section.

The display output section includes a display screen such as a liquid crystal display (LCD), an LED lamp, a speaker and a generation section of beep sound, for example.

The input operation receiving section includes various external operation devices such as a touch sensor provided so as to be superposed on the LCD, push button switches, a slide switch, a key board, a numeric keypad panel, a mouse and a trackball.

The measurement section includes a temperature sensor, a vibration sensor, an illuminance sensor and such like, and is activated to perform measurement as needed.

The control section 11, memory 12, device group 13 and the peripheral devices thereof are collectively described as the electronic circuit 10.

The RF tag 14 is a chip which can transmit and receive predetermined information by performing Near-Field Communication (NFC) with the external equipment 3 via the antenna 141. The RF tag 14 is activated to operate by the received radio waves as a power source independently from the power supply by the secondary battery 21. The RF tag 14 may also be able to perform the active operation by the power supply from the secondary battery 21. The RF tag 14 includes: a non-volatile memory such as a flash memory which holds its unique identification information and can read and write predetermined information by communicating with the external equipment 3; and a control circuit according to the reading and writing operations of the non-volatile memory. The information held in the non-volatile memory of RF tag 14 can also be read out and rewritten by the control section 11. Further, the information held in the control section 11 can be input/output to the external equipment 3 via the RF tag 14. The control circuit of the RF tag 14 can output an Interrupt ReQuest (IRQ) for making the control section 11 end the operation thereof to shut down according to a specific command received from the external equipment 3.

A communication processing section is configured by including the RF tag 14 and the antenna 141.

The secondary battery 21 supplies electric power for operation to all the devices in the electronic equipment 1 such as the control section 11, memory 12 and device group 13 which need power supply. The secondary battery 21 can be charged and stores electric power transmitted from an external power feeding unit via the power receiving section 18. Various known batteries can be used as the secondary battery 21, and a lithium-ion battery is used here, for example.

The protection circuit 22 is a control IC which prevents over discharge of the secondary battery 21 and output of overcurrent such as short-circuit current. The protection circuit 22 is operated by the output voltage and current of the secondary battery 21 regardless of the operation of control section 11 which is a supply destination. The protection circuit 22 is generally integrally formed with the secondary battery 21 as a battery pack 20, and attached to the electronic equipment 1.

The switching element 15 switches on/off the connection of power supply line between the battery pack 20 and the circuit IC 17. A preferably used switching element 15 is a switching element which maintains connection state even while power for switching the switch state is not supplied. The switching element 15 is turned off (cutoff state) at least while the power for switching is not supplied. As such switching element 15, for example, a mechanical switch which requires electric power only at the time of switching is used.

The delay circuit 16 is a circuit which, when the switching element 15 is to be turned off, holds the electric power and instruction for delaying the operation by a predetermined period of time after the operation of control section 11 is stopped. The electric power is held by a capacitor and such like which maintains, at a predetermined voltage, the electric power obtained from the received radio waves by the RF tag 14. After the predetermined period of time elapses, the electric power is output as a voltage (current) signal for switching the switching element 15 to the switching element 15.

At the normal time, the circuit IC 17 outputs electric power (operating current or standby current), which was supplied from the secondary battery 21, to the control section 11. When electric power is supplied from an external power feeding apparatus, the circuit IC 17 outputs the electric power to the control section 11 and performs switching control as needed by transmitting the electric power to the secondary battery 21 to charge the secondary battery 21. The switching regarding whether to charge the secondary battery 21 may be partially performed by the control section 11.

The power receiving section 18 is a connecting section which receives electric power from an external power feeding unit, and includes a terminal connector such as a power cable and a USB (Universal Serial Bus) cable, and antenna which acquires the change in electromagnetic field according to wireless charge, for example. The external power feeding unit may be a dedicated charging apparatus, or electric power may be directly acquired by simple connection with an outlet of household power supply. The power receiving section 18 may include a rectifier circuit, a frequency conversion circuit, a smoothing circuit and such like as needed.

Here, as the external equipment 3, a portable equipment such as a smartphone and a mobile phone is preferably used, the portable equipment having a function of communicating with the RF tag 14 and reading/writing the non-volatile memory data of the RF tag 14.

Next, switching operation of the switching element 15 in the embodiment will be described.

First, the operation procedure of turning on the switching element 15 which has been turned off in the initial state will be described.

FIG. 2 is a flowchart showing the operation procedure of start processing of the electronic equipment 1 in the embodiment.

When a power feeding unit is connected to the power receiving section 18 to start power feeding, the power feeding is detected by the circuit IC 17 (step S100) (supply detecting step), electric power is supplied from the circuit IC 17 to the control section 11, and the control section 11 is activated to start the battery connection operation (step S101). Here, the control section 11 outputs a drive signal for turning on the switching element 15 in an initial activation operation (step S102). The control section 11 receives the power supply from the secondary battery 21 and/or the power receiving section 18 to perform a functional operation, and switches whether to charge the secondary battery 21, that is, the direction of current flow in the circuit IC 17 as needed (step S103). Then, the start processing ends.

The processing of steps S101 and S102 corresponds to battery connection step.

In such way, the switching element 15 in the electronic equipment 1 is turned on (cutoff is released) by power supply from outside as a trigger, allowing the use of secondary battery 21.

Next, the procedure of battery cutoff operation and restart processing in the electronic equipment 1 via the RF tag 14 will be described.

As described above, the electronic equipment 1 in the embodiment is capable of stopping operation and turning off the switching element 15 by receiving the command according to the battery cutoff from the external equipment 3. The command is, for example, transmitted from the external equipment 3 by user's operation via a dedicated application program (app) corresponding to the electronic equipment 1.

FIG. 3 is a flowchart showing the procedure of battery cutoff processing by the RF tag 14.

The RF tag 14 is activated by receiving a signal according to polling from the external equipment 3, and returns a predetermined reply signal to perform communication connection (step S201). The RF tag 14 (control circuit) analyzes the command from the external equipment 3 and determines whether the command is a command (stop instruction) according to the operation stop of the electronic equipment 1 (control section 11) (step S202). If it is not determined that the command is the command according to the operation stop of electronic equipment 1 (step S202: NO), the control circuit of RF tag 14 performs processing in accordance with the contents of the command.

The processing of steps S201 and S202 corresponds to communication processing step.

If it is determined that the command is the command according to the operation stop of electronic equipment 1 (step S202: YES), the control circuit of RF tag 14 communicates with the control section 11 and performs pre-stop operation, that is, outputs a command (interruption by IRQ) instructing shutdown operation (stop operation) to the control section 11 (step S203). The RF tag 14 directly transmits predetermined setting data (setting information), which is transmitted from the control section 11 to the external equipment 3, to the external equipment 3 (backup processing) (step S204). At this time, the RF tag 14 can store information mainly according to the secondary battery 21 such as information regarding a battery remaining amount and an output voltage in the non-volatile memory. In the electronic equipment 1, the operation of device group 13 is stopped by the control of control section 11.

The control circuit of RF tag 14 determines whether the backup of all data and the device shutdown are finished so that the operation of electronic equipment 1 can be turned off (step S205). If it is not determined that the operation of electronic equipment 1 can be turned off (step S205: NO), the RF tag 14 returns the processing to step S204 and continuously performs backup copying and such like.

If it is determined that the operation of electronic equipment 1 can be turned off (step S205: YES), the RF tag 14 performs battery cutoff operation of outputting a signal (electric power) to the delay circuit 16 so as to cut the connection of switching element 15 after the predetermined delay time elapses (step S206). After the electronic equipment 1 is allowed to turn off the operation, the control section 11 finally performs saving operation of the RAM 112, the memory 12 and such like, and stops the operation of CPU 111. By making the switching element 15 cuts the connection of switching element 15 with the delay time longer than a required time of the saving operation of RAM 112, memory 12 and such like, the delay circuit 16 prevents the switching element 15 from being turned off before the operation of control section 11 is completely stopped. The operation of RF tag 14 ends when the processing of step S206 is finished.

The processing of steps S203 to S206 corresponds to battery cutoff step.

FIG. 4 is a flowchart showing the operation procedure of restart processing.

In the restart processing, the processing of steps S111 and S112 is added to the above-mentioned start processing, and the same numerals are provided to the same processing contents to omit the explanation thereof.

In the restart processing, after the control section 11 is activated, the control section 11 determines whether the RF tag 14 is communicably connected to the external equipment 3 (step S111), and if the RF tag 14 is not connected (step S111: NO), the processing of step S111 is repeated to standby. If the RF tag 14 is connected (step S111: YES), the control section 11 acquires, via the RF tag 14, an instruction of releasing the cutoff of power supply from the secondary battery 21 to the electronic circuit 10 by the switching element 15 and setting data (predetermined information) which was transmitted to the external equipment 3 at the time of battery cutoff, and the control section 11 performs operation setting based on the setting data (step S112). Thereafter, the processing of control section 11 proceeds to step S102 and the switching element 15 is turned on.

As described above, the electronic equipment 1 in the embodiment includes: an electronic circuit 10 which includes the control section 11 and performs a predetermined functional operation; a secondary battery 21 which supplies electric power to the electronic circuit 10; a circuit IC 17 which detects power supply from outside; and a switching element 15 which cuts off power supply from the secondary battery 21 to the electronic circuit 10. When the power supply from outside is detected, the circuit IC 17 performs the battery connection operation of releasing the cutoff of power supply by the switching element 15.

In such way, by completely separating the secondary battery 21 from the electronic circuit 10, it is possible to completely cut off the electric current which generally flows from the secondary battery 21 to the electronic circuit 10 even while the operation is stopped. Thus, it is possible to prevent the discharge of battery more easily and effectively. Thus, even if time elapses until the product shipment of electronic equipment 1, the discharge and deterioration of secondary battery 21 are suppressed, and the generation of problems is prevented. Further, since the user does not need to detach the battery every time for management, the troublesome work is suppressed.

As the battery connection operation, the circuit IC 17 supplies the electric power, which was supplied from outside, to the control section 11 to activate the control section 11, and the activated control section 11 releases the cutoff of secondary battery 21 by the switching element 15. Accordingly, in the electronic equipment 1, release of the cutoff can be appropriately controlled after judging the situation according to the previous charge state and setting state of secondary battery 21, and such like.

The electronic equipment 1 includes the RF tag 14 which communicates with the external equipment 3, and the RF tag 14 performs the battery cutoff operation of cutting off the power supply from the secondary battery 21 by the switching element 15 when the RF tag 14 acquires the predetermined stop instruction from the external equipment 3. Accordingly, even when the electronic equipment 1 is not normally assumed to stop the operation and the power supply, the shutdown processing can be appropriately performed from outside.

In accordance with the stop instruction from outside, the RF tag 14 makes the control section 11 perform the stop operation of stopping the functional operation of electronic circuit 10, and after the stop operation is completed, the battery cutoff operation is performed so as to cut off the power supply from the secondary battery 21 by the switching element 15. Thus, since the RF tag 14 is operated by independent electric power, the power supply can be cut by the switching element 15 safely after the shutdown of control section 11. This avoids problems in the operation of control section 11.

The stop operation by the control section 11 includes backup processing of the setting information held by the control section 11. Accordingly, even in an electronic equipment which does not normally assume backup for power cutoff, the current setting state is taken over at the time of restart and the operation can be appropriately performed by using the backup data.

As the battery connection operation, the circuit IC 17 supplies the electric power, which was supplied from outside, to the control section 11 to activate the control section 11. After the RF tag 14 is communicably connected to the external equipment 3 and acquires the instruction of releasing the cutoff of power supply from the secondary battery 21 by the switching element 15, the activated control section 11 outputs the signal of releasing the cutoff to the switching element 15. In such way, since use of the secondary battery 21 is restarted after acquiring necessary information from the external equipment in advance, the use of electronic equipment 1 and the secondary battery 21 can be restarted in an appropriate setting state.

The RF tag 14 makes the control section 11 perform stop operation in accordance with the stop instruction from outside, and after the stop operation is completed, the battery cutoff operation is performed so as to cut off power supply from the secondary battery 21. In the stop operation, the control section 11 transmits the setting information held by the control section 11 to the external equipment 3 via the RF tag 14.

Accordingly, even in an electronic equipment 1 which is not assumed to take over the setting by power cutoff, the backup data can be easily saved outside, and the setting can be taken over by acquiring the backup data at the time of restart.

Since the RF tag 14 can perform wireless communication via NFC with the external equipment 3, and operate by the received radio waves according to the wireless communication as a power source, the RF tag 14 does not need wired connection with the electronic equipment 1, and can easily perform the stop operation. Since the RF tag 14 operates independently from the secondary battery 21 which is a power source inside the electronic equipment 1, the RF tag 14 can be used appropriately for managing the switching element 15. Further, the management of backup data can be performed easily especially by using a mobile phone or a smartphone.

The secondary battery 21 is used as a battery for supplying electric power and can be charged in accordance with the power supply from outside. Thus, the restart can be performed easily by using a connection terminal and a power supply unit which are originally prepared for charging. By using the above configuration especially for a secondary battery 21 which is likely to have a relatively large amount of discharge when it is not used, the discharge of secondary battery 21 when not used can be suppressed more effectively.

The present invention is not limited to the above embodiment, and various changes can be made.

For example, though the switching element 15 can be turned off again after the initial activation in the embodiment, the switching element 15 does not need to be turned off again for an electronic equipment which does not assume the turning off after the activation. In this case, the change from the initial off-state to an on-state may be an irreversible operation.

In the embodiment, the RF tag 14 is used to allow the communication with outside and the independent operation from the control section 11. However, there may be also used anything which is not used as the RF tag as long as it has a control section of low electric power which can operate independently. The communication may be communication other than NFC, for example, communication using Bluetooth (registered trademark) of low power consumption mode, and further, the operation power may be supplied by using a USB cable and such like in a wired connection using the cable.

In the embodiment, backup of setting information is output to the external equipment and acquired at the time of restart. However, the setting information may be stored in a non-volatile memory inside the electronic equipment 1. In a case where the setting information does not especially need to be stored, the backup is not necessary, and the initial data may be used each time activation is performed. In this case, when there is no concern about breakdown, for example, the switching element 15 may be turned off without waiting for the completion of shutdown operation of the control section 11.

In the embodiment, the control section 11 turns on the switching element 15 after the control section 11 is activated as the battery connection operation. However, the circuit IC 17 may be capable of directly turning on the switching element 15. In this case, the detection of power supply from an external power supply unit and the operation of turning on the switching element 15 may be executed simultaneously. In addition, in this case, when sufficient electric power is stored in the secondary battery 21, the secondary battery 21 may activate the control section 11. As the amount of electric power to be supplied by a power supply unit via the power receiving section 18, the amount of electric power necessary for the circuit IC 17 to switch the switching element 15 is enough, and the power supply unit may not continuously supply electric power.

The information, which is to be acquired from the external equipment 3 when the control section 11 is activated, is not limited to the information which was output for backup. The information may be other information, or may include other information. In a case where the setting information is stored in the memory 12 inside the electronic equipment 1, for example, it is not necessary to communicably connect with the external equipment 3 or acquire the setting information as long as the restart is performed promptly by the start of power supply from the circuit IC 17.

In the embodiment, the circuit IC 17 is an independent component. However, the power supply section 18 may have the function of circuit IC 17.

In the embodiment, the normal operation power supply is performed from the secondary battery 21 which can be charged. However, the battery to supply electric power to the sections of electronic equipment 1 may be a dry cell battery which cannot be charged. In many cases, dry cell batteries which cannot be charged are difficult to use in other equipments in maintaining the same use state of batteries which were detached when not used. Thus, the management can be performed easily by effectively preventing the discharge while maintaining the attached state.

As for the other specific configurations, contents of operations, procedures and such like shown in the embodiment, modification can be appropriately made within the scope of the present invention.

Though several embodiments of the present invention have been described above, the scope of the present invention is not limited to the above embodiments, and includes the scope of inventions, which is described in the scope of claims, and the scope equivalent thereof.

What is claimed is:
1. An electronic equipment, comprising:
an electronic circuit which includes a control section and performs a predetermined functional operation;
a battery which supplies electric power to the electronic circuit;
a supply detecting section which detects power supply from outside; and a supply cutoff section which cuts off power supply from the battery to the electronic circuit, wherein, when the supply detecting section detects the power supply from outside, the supply detecting section performs a battery connection operation of releasing the cutoff of the power supply from the battery to the electronic circuit by the supply cutoff section and supplying electric power from the battery to the electronic circuit.

2. The electronic equipment according to claim 1, wherein:

as the battery connection operation, the supply detecting section supplies electric power, which is supplied from outside, to the control section to activate the control section, and the activated control section releases the cutoff of the power supply from the battery to the electronic circuit.

3. The electronic equipment according to claim 1, further comprising a communication processing section which communicates with an external equipment, wherein, when a predetermined stop instruction is acquired from the external equipment, the communication processing section performs a battery cutoff operation of making the supply cutoff section cut off the power supply from the battery to the electronic circuit.

4. The electronic equipment according to claim 3, wherein the communication processing section makes the control section perform a stop operation of stopping the functional operation of the electronic circuit in accordance with the stop instruction, and the communication processing section performs the battery cutoff operation so that the cutoff is performed after the stop operation is completed.

5. The electronic equipment according to claim 4, wherein the stop operation includes backup processing of setting information which is held by the control section.

6. The electronic equipment according to claim 3, wherein:

as the battery connection operation, the supply detecting section supplies electric power, which is supplied from outside, to the control section to activate the control section, and after the communication processing section is communicably connected to the external equipment and acquires a predetermined release instruction, the activated control section releases the cutoff of the power supply from the battery to the electronic circuit.

7. The electronic equipment according to claim 6, wherein:

the communication processing section makes the control section perform a stop operation of stopping an operation in accordance with the stop instruction, and the communication processing section performs the battery cutoff operation so that the cutoff is performed after the stop operation is completed, and in the stop operation, the control section transmits setting information held by the control section to the external equipment via the communication processing section.

8. The electronic equipment according to claim 3, wherein the communication processing section performs wireless communication with the external equipment, and the communication processing section operates by radio waves received according to the wireless communication as a power source.

9. The electronic equipment according to claim 1, wherein the battery is a secondary battery and is charged in accordance with the power supply from outside.

10. A battery connection method of an electronic equipment, the electronic equipment including an electronic circuit which includes a control section and performs a predetermined functional operation, a battery which supplies electric power to the electronic circuit, and a supply cutoff section which cuts off power supply from the battery to the electronic circuit, and the method comprising:

a supply detecting step of detecting power supply from outside; and a battery connection step of releasing the cutoff of the power supply from the battery to the electronic circuit by the supply cutoff section and supplying electric power from the battery to the electronic circuit, when the power supply from outside is detected in the supply detecting step.

11. The battery connection method according to claim 10, wherein:

in the battery connection step, electric power which is supplied from outside is supplied to the control section to activate the control section, and the activated control section releases the cutoff of the power supply from the battery to the electronic circuit.

12. The battery connection method according to claim 10, further comprising:

a communication processing step of communicating with an external equipment; and a battery cutoff step of performing a battery cutoff operation of making the supply cutoff section cut off the power supply from the power battery to the electronic circuit when a predetermined stop instruction is acquired from the external equipment.

13. The battery connection method according to claim 12, wherein, in the battery cutoff step, the control section is made to perform a stop operation of stopping the functional operation of the electronic circuit in accordance with the stop instruction, and the battery cutoff operation is performed so that the cutoff is performed after the stop operation is completed.

14. The battery connection method according to claim 13, wherein the stop operation includes backup processing of setting information which is held by the control section.

15. The battery connection method according to claim 12, wherein:

in the battery connection step, electric power which is supplied from outside is supplied to the control section to activate the control section, and after communication connection to the external equipment is performed by the communication processing step and a predetermined release instruction is acquired, the activated control section releases the cutoff of the power supply from the battery to the electronic circuit.

16. The battery connection method according to claim 15, wherein:

in the battery cutoff step, the control section is made to perform a stop operation of stopping an operation in accordance with the stop instruction, and the battery cutoff operation is performed so that the cutoff is performed after the stop operation is completed, and in the stop operation, the control section transmits setting information held by the control section to the external equipment by the communication processing step.

17. The battery connection method according to claim 12, wherein, in the communication processing step, wireless communication with the external equipment is performed, and an operation is performed by radio waves received according to the wireless communication as a power source.

18. The battery connection method according to claim 10, wherein the battery is a secondary battery and is charged in accordance with the power supply from outside.

\* \* \* \* \*